United States Patent [19]

Morawski

[11] 4,201,394
[45] May 6, 1980

[54] COLLET CHUCK

[76] Inventor: London T. Morawski, 15850 Common Rd., Roseville, Mich. 48066

[21] Appl. No.: 965,290

[22] Filed: Dec. 1, 1978

[51] Int. Cl.² ............................................. B23B 31/40
[52] U.S. Cl. ...................... 279/2 R; 82/44; 242/72.1; 269/48.1
[58] Field of Search .............. 279/2 R, 2 A, 4; 269/48.1; 82/44; 242/72.1

[56] References Cited

U.S. PATENT DOCUMENTS

| | | | |
|---|---|---|---|
| 1,928,979 | 10/1933 | Levison | 242/721 X |
| 3,490,778 | 1/1970 | Parker | 279/2 R |
| 3,909,021 | 9/1979 | Morawski et al. | 279/2 R |

Primary Examiner—Z. R. Bilinsky
Attorney, Agent, or Firm—Barnes, Kisselle, Raisch & Choate

[57] ABSTRACT

A collet chuck for gripping a workpiece around the internal diameter thereof having a collet sleeve expanded and contracted by axial movement over a tapered nose cone at the forward end of a collet expander. The collet sleeve is connected by a plurality of axially extending pins with a collet puller plate. The collet puller plate is guided for axial movement and prevented from cocking relative to the rotary axis of the chuck by means of a pilot pin on the puller plate slidably mounted in a pilot bore on the expander member of the chuck.

5 Claims, 2 Drawing Figures

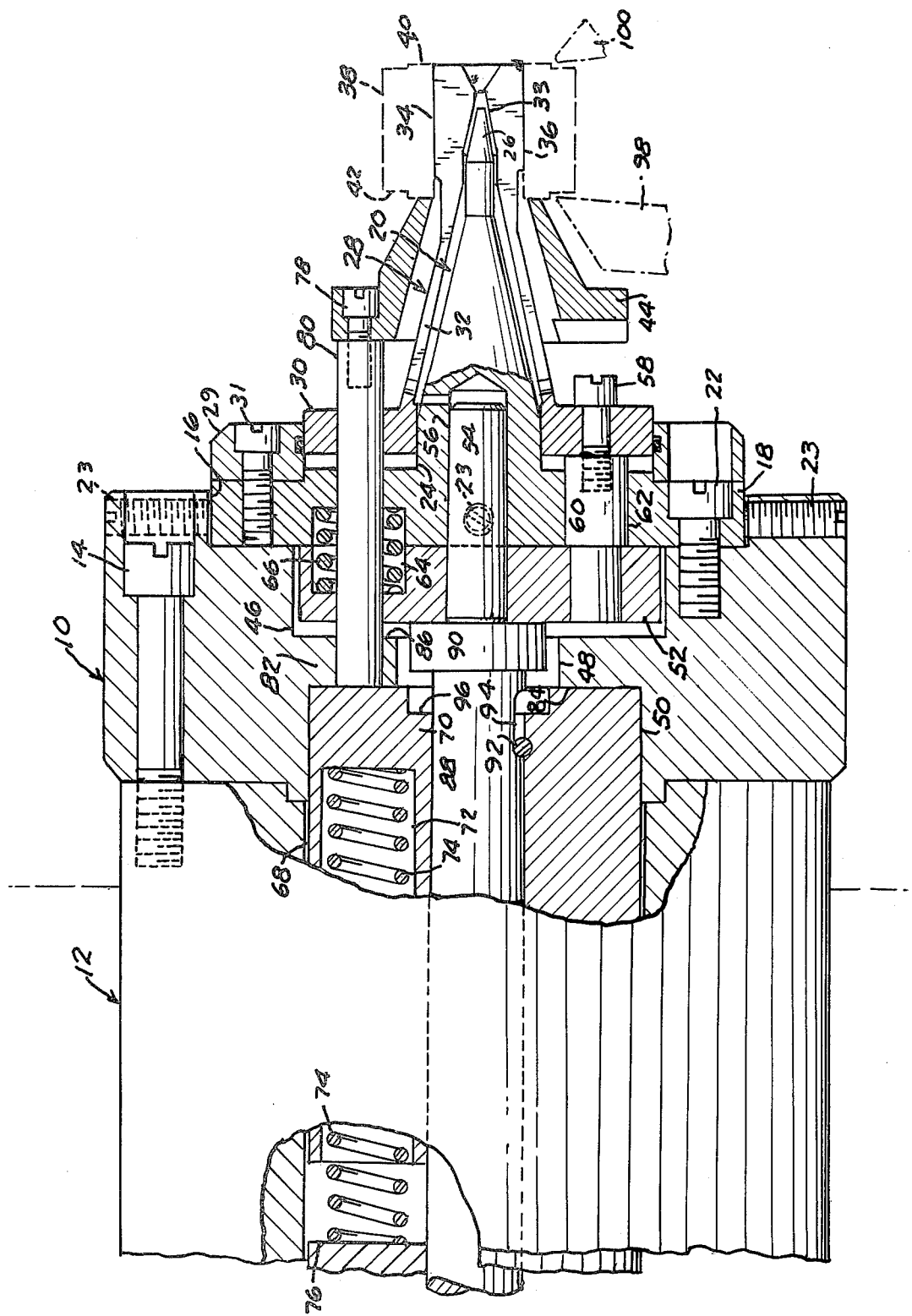

COLLET CHUCK

This invention relates to a collet chuck.

In one form of collet chuck for gripping the internal diameter of a workpiece a collet sleeve is caused to expand radially to grip the workpiece by displacing it axially over a tapered nose cone member fixedly mounted on the body of the chuck. Such a chuck is illustrated in U.S. Pat. No. 3,909,021. In such chucks the nose cone is ground accurately concentric with the rotary axis of the chuck and has a short axially extending shoulder thereon on which the collet sleeve is piloted for axial movement. The collet sleeve is shifted axially by connecting it with an axially shiftable puller within the chuck body by means of a plurality of circumferentially spaced puller pins. The puller plate is operatively connected to a drawbar. With a chuck of this type, if the plane of the puller plate becomes slightly cocked; that is, not accurately perpendicular to the axis of the chuck, the collet sleeve may also become cocked and the radial faces of the workpiece being machined will end up being slightly non-perpendicular to the central axis of the workpiece. This is particularly true in connection with chucks for gripping small diameter workpieces since, with such small diameter workpieces, the nose cone itself is of relatively small diameter and, thus, capable of being distorted by a cocked collet sleeve.

The primary object of this invention is to prevent a collet chuck from gripping a workpiece in a manner such that the central longitudinal axis of the workpiece is not accurately parallel to and concentric with the rotary axis of the chuck.

Another object of the invention is to provide a collet chuck construction wherein means are provided for preventing the collet sleeve from becoming cocked relative to the rotary axis of the chuck.

A more specific object of this invention is to provide a pilot pin on the collet puller plate that is guided for accurate axial movement in a pilot bore on the body of the collet expanding member.

Other objects, features and advantages of the present invention will become apparent from the single FIGURE which is a fragmentary side elevational view, partly in section, of a chuck embodying the present invention.

One form of chuck embodying the present invention comprises a body 10 adapted to be secured to a rotary driven spindle 12 of a machine tool by means of a plurality of screws 14. The front face of body 10 is formed with a circular recess 16 in which the base flange 18 of a collet expander member 20 is secured as by screws 22 and centered therein as by four perpendicularly spaced screws 23. Screws 23 enable positioning of expander member 20 so that its longitudinal axis is accurately coaxial with the rotary axis of machine spindle 12. Expander member 20 has a forwardly projecting cylindrical boss 24 terminating in a conical nose 26 at the forward end thereof. The expandable collet, generally designated 28, has an annular base plate portion 30 which is guided for axial movement on the cylindrical boss 24 of expander member 20. The outer periphery of plate portion 30 preferably has a relatively close sliding fit with a ring 29 secured to flange 18 by screws 31. Collet 28 includes a sleeve portion comprising a plurality of circumferentially adjacent spring fingers 32 which are separated by axially extending slots. The distal end of collet 28 is internally tapered as at 33 to correspond with the taper on the conical nose 26 of expander member 20. The outer periphery of collet 28 at its forward end is cylindrically shaped as at 34 for engaging the internal cylindrical bore 36 of a workpiece 38. The inner and outer surfaces 33,34 of collet 28 are ground so as to be accurately concentric with the central longitudinal axis of expander member 20. Workpiece 38 has a front face 40 and a rear face 42, both of which require machining in a plane accurately perpendicular to the central axis of the workpiece. The axial position of workpiece 38 on collet 28 is determined by an annular stop 44 adapted to be abutted by the face 42.

Body 10 is formed with three bores 46,48,50 concentric with recess 16 at the front face thereof. Within bore 46 there is arranged a collet puller plate 52 which is guided for axial movement by means of a pilot pin 54 in a bore 56 extending along the central axis of expander member 20. Bore 56 is ground accurately concentric to the central axis of expander member 20. Pin 54 is likewise accurately ground to have a close sliding fit in bore 56. The length of pin 54 extending beyond puller plate 52 is preferably at least 2½ times the diameter of the pin to eliminate the possibility of the pin becoming even slightly cocked in bore 56. Pin 54 is fixedly mounted on puller plate 52 so that its axis is accurately perpendicular to the plane of the puller plate. Thus, the plane of puller plate 52 is always accurately perpendicular to the central axis of expander 20. The base plate portion 30 of collet 28 is connected by screws 58 with pins 60 fixed on puller plate 52. Pins 60 are slidable through openings 62 in the base flange 18 of expander 20. A slight clearance is provided between pins 60 and openings 62 and between screws 58 and the holes in base flange 30 through which the screws extend so as to not interfere with the guiding action of pin 54 on pilot bore 56.

The rear face of base flange 18 and the front face of plate 52 are formed with a plurality of axially aligned pockets 64 in which are arranged springs 66. Springs 66 normally bias puller plate 52 rearwardly so that the forward cylindrical end 34 of collet 28 is radially expanded by the conical nose portion 26 to grip workpiece 38.

Within the bore 50 of body 10 and an axially aligned bore 68 in spindle 12 there is slidably arranged a bushing 70. Bushing 70 is formed with a plurality of circumferentially spaced, axially extending pockets 72 in which are arranged compression springs 74. The forward ends of springs 74 bear against the front ends of pockets 72 and the rear ends of springs 74 bear against a fixed shoulder 76 on spindle 12. Stop 44 is connected by screws 78 to a plurality of pins 80 which extend through base plate 30 of collet 28, base flange 18 of expander 20, puller plate 52, and the annular disc portion 82 of body 10 which separates bores 46,50. The inner ends of pins 80 are securely connected to the front end of bushing 70. Springs 74 normally bias bushing 70 forwardly into abutting relation with the rear face 84 of the disc portion 82 which separates bores 46,50. The rear face 84 of disc portion 82 forms a stop shoulder for bushing 70 which locates the forward end of stop 44 in an accurately predetermined, axial position against which the rear face 42 of workpiece 38 is adapted to abut. If desired, one or more spacer discs can be located against face 84 to obtain the desired location of the front end of stop 44. It will be noted that, when the forward end of bushing 70 abuts the face 84, the rear end of bushing 70 is spaced axially forwardly from the fixed shoulder 76 on the spindle 12. Likewise, it will be noted that the axial dimension of bore 46 between the front face 86 of disc portion 82 and the rear face of base flange 18 is substantially greater than the axial thickness of puller plate 52.

Within spindle 12 there is arranged an axially shiftable drawbar 88 which is slidably arranged within bushing 70 along the central axis of the chuck. At its forward end drawbar 88 is formed with an enlarged cylindrical head 90. Drawbar 88 is prevented from rotating relative to bushing 70 by means of a pin 92 on bushing 70 engaging a flat 94 formed with a counterbore 96 which is at least slightly larger than the diameter of the enlarged head 90 at the forward end of the drawbar 88.

In order to mount a workpiece 38 on the cylindrical end 34 of collet 28 the collet has to be shifted forwardly to collapse the cylindrical end 34 to a diameter at least slightly less than the bore 36 of the workpiece. This is accomplished by displacing drawbar 88 forwardly so that the enlarged head 90 thereof passes through bore 48, abuts against puller plate 52, and displaces it forwardly to the position shown wherein the springs 66 are compressed. When drawbar 88 is shifted forwardly, the enlarged head 90 moves out of engagement with the end face of counterbore 96 of bushing 70 so that the bushing 70 is free to shift forwardly under the bias of springs 74 to a position shown in the drawing wherein the front end of bushing 70 engages the shoulder face 84 of disc portion 82 in body 10. Thus, when the drawbar 88 is shifted forwardly to the position shown in the drawing, the collet is collapsed and a workpiece 38 is adapted to be slipped over the cylindrical end portion 34 into engagement with the forwardly positioned annular stop 44. In this condition of the collet, pilot pin 54 is fully advanced in the pilot bore 56 to retain the collet in a position wherein its central axis is accurately coaxial with the central axis of expander member 20.

After the workpiece is placed over the collet, drawbar 88 is retracted. As soon as drawbar 88 starts to retract, puller plate 52 is shifted rearwardly by springs 66 to interengage the end 34 of the collet with the conical nose 26 of expander 20 and, thus, expand end 34 into firm engagement with the bore 36 of workpiece 38. The axial dimension of bore 46 is such that the collet will be fully expanded by springs 66 before the rear face of puller plate 52 engages the front face 86 of the disc portion 82 in body 10.

Thus, as the drawbar continues to retract, the enlarged head 90 at the forward end thereof moves out of engagement with puller plate 52 and, thereafter, engages bushing 70 and displaces the bushing rearwardly against the bias of springs 74. Since the annular stop 44 is connected to bushing 70 by pins 80, the stop 44 is retracted after the workpiece is firmly gripped by the collet. Since the stop 44 is in the retracted position, cutting tools 98,100 are adapted to be advanced toward the workpiece for machining faces 40,42 without any interference from the stop 44.

It will be observed that, when the puller plate 52 retracts, pilot pin 54, guided by pilot bore 56, causes the plate 52 to move in a highly accurate axial path with its plane at all times perpendicular to the axis of the collet. Therefore, if the cylindrical end 34 of the collet and the nose cone 26 are ground accurately concentric with the axis of expander 20, a highly accurate positioning of the workpiece 36 on the collet is assured and the machined end faces 40,42 on the workpiece will be perpendicular to the central axis of the workpiece to a high degree of accuracy. This high degree of accuracy is obtained regardless of the diameter and rigidity of the nose cone 26. Where the diameter of the nose cone is relatively small, such as shown in the drawing, it is preferred to utilize a pilot pin 54 having an at least slightly larger diameter so that structurally the pilot pin is more rigid than the nose cone.

It will be appreciated that as long as the puller plate 52 is guided on the expander by means of the pilot pin 54 in pilot bore 56, a high degree of accuracy is obtained regardless of the specific means employed for shifting the puller plate 52 axially. For example, in some collet chuck arrangements puller plate 52 could be connected directly to drawbar 88, if desired.

I claim:

1. A collet chuck having a body at its rear end adapted to be fixedly mounted on the rotary spindle of a machine tool and having a collet expander at its forward end mounted on said body, the front end of said collet expander having a tapered nose formed integrally therewith which is accurately concentric with the central axis of the expander, means for adjusting the expander radially on said body so that the expander is concentric to a high degree of accuracy with the rotary axis of the spindle on which the body is fixedly mounted, said expander having adjacent its rear end a cylindrical shoulder thereon concentric with the axis of the expander, the axial length of said shoulder being less than the diameter of said shoulder, a collet sleeve having its rear end portion mounted on said shoulder for axial sliding movement on the expander, the forward end of said sleeve being resiliently circumferentially expandable and contractable to grip and release the bore of a workpiece, the forward end of said collet sleeve being engageable with said tapered nose to expand when shifted axially in one direction and to contract when shifted axially in the opposite direction, a collet puller plate in said body, a plurality of circumferentially spaced, axially extending and radially rigid pins rigidly connected to one end to the rear end of said collet sleeve and rigidly connected at their opposite ends to said puller plate, means operatively connected with said puller plate for shifting it axially within an oversize bore in said body, said expander having a central pilot bore therein accurately concentric with the central axis of the expander, and a pilot pin having a close sliding fit within said pilot bore, said pilot pin being rigidly mounted on said puller plate and extending axially forwardly thereof, the axial length of the portion of said pilot pin within said pilot bore and the axial length of said pilot bore being substantially greater than the diameter of said pilot pin and bore so that the pilot pin and bore prevent the collet sleeve from becoming cocked on said cylindrical shoulder whereby, in response to axial displacement of the puller plate, said pilot pin constrains movement of the puller plate and collet sleeve axially in a highly accurate path concentric with the axis of said tapered nose.

2. A collet chuck as called for in claim 1 wherein said plurality of pins extend axially through the inner end portion of said expander with a clearance fit.

3. A collet chuck as called for in claim 1 wherein the portion of the pilot pin within said pilot bore has a length-to-diameter ratio of at least 2½ to 1.

4. A collet chuck as called for in claim 1 wherein the diameter of said pilot pin is greater than the maximum diameter of said tapered nose.

5. A collet chuck as called for in claim 1 wherein said nose tapers to a small diameter in a forward direction and the forward end of the collet sleeve is expanded when the puller plate is shifted axially in a direction inwardly of the chuck body.

* * * * *